United States Patent
Zhao et al.

(10) Patent No.: US 12,001,789 B2
(45) Date of Patent: Jun. 4, 2024

(54) TEXTUAL DATA ANALYTICS

(71) Applicant: S&P Global Inc., New York, NY (US)

(72) Inventors: Fanxi Zhao, Boston, MA (US); David Pope, North Andover, MA (US); Daniel Sandberg, North Babylon, NY (US); Temilade Oyeniyi, Chicago, IL (US); Ashish Sumsher Rana, Silver Springs, MD (US); Eric Oak, Framingham, MA (US)

(73) Assignee: S&P Global Inc., New York, NY (US)

(*) Notice: Subject to any disclaimer, the term of this patent is extended or adjusted under 35 U.S.C. 154(b) by 511 days.

(21) Appl. No.: 17/446,220

(22) Filed: Aug. 27, 2021

(65) Prior Publication Data

US 2023/0061590 A1 Mar. 2, 2023

(51) Int. Cl.
| | | |
|---|---|---|
| *G06F 40/20* | (2020.01) | |
| *G06F 40/216* | (2020.01) | |
| *G06F 40/279* | (2020.01) | |
| *G06N 5/04* | (2023.01) | |

(52) U.S. Cl.
CPC .......... *G06F 40/216* (2020.01); *G06F 40/279* (2020.01); *G06N 5/04* (2013.01)

(58) Field of Classification Search
CPC ........ G06F 40/20; G06F 40/279; G06F 40/35; G10L 15/26
See application file for complete search history.

(56) References Cited

U.S. PATENT DOCUMENTS

| | | | | |
|---|---|---|---|---|
| 10,445,668 | B2 * | 10/2019 | Oehrle | G06N 7/01 |
| 2009/0198488 | A1 * | 8/2009 | Vigen | G06F 40/30 704/9 |
| 2017/0270409 | A1 * | 9/2017 | Trischler | G06F 40/30 |
| 2021/0272040 | A1 * | 9/2021 | Johnson | G06N 5/022 |
| 2023/0418859 | A1 * | 12/2023 | Park | G06F 40/221 |

OTHER PUBLICATIONS

Zhao, "Natural Language Processing—Part I: Primer," Quantamental Research, S&P Global Market Intelligence, Sep. 2017, 29 pages. https://www.spglobal.com/marketintelligence/en/documents/mi-research-qr-nlp-part-ii-180912-new.pdf.
(Continued)

*Primary Examiner* — Daniel Abebe
(74) *Attorney, Agent, or Firm* — Yee & Associates, P.C.

(57) ABSTRACT

A method of textual data analysis is provided. The method comprises parsing text data extracted from transcripts related to a number of companies. Intermediate metrics are created comprising numerical representations of the parsed text data and derivations. The intermediate metrics are then combined into different combinations comprising headline analytics. A machine learning model tests each headline analytic for standalone predictive efficacy. Headline analytics with standalone predictive efficacies above a first threshold are selected and then tested for additive predictive efficacy to determine if the selected headline analytic incrementally increases the predictive efficacy of a preexisting economic analytic above a second threshold. Headline analytics with additive predictive efficacy above the second threshold are applied to a second number of transcripts in combination with the preexisting economic analytic to predict financial performance of companies that are the subjects of the second number of transcripts.

36 Claims, 5 Drawing Sheets

(56) References Cited

OTHER PUBLICATIONS

Zhao, "Natural Language Processing—Part II: Stock Selection," Quantamental Research, S&P Global Market Intelligence, Sep. 2018, 42 pages. https://www.spglobal.com/marketintelligence/en/documents/sp-global-market-intelligence-nlp-primer-Sep. 2018.pdf.

Zhao, "Natural Language Processing—Part III: Feature Engineering," Quantamental Research, S&P Global Market Intelligence, Jan. 2020, 42 pages. https://www.spglobal.com/marketintelligence/en/documents/nlp-iii-final-013020-10a.pdf.

* cited by examiner

US 12,001,789 B2

TEXTUAL DATA ANALYTICS

BACKGROUND INFORMATION

1. Field

The present disclosure relates generally to an improved computing system, and more specifically to a method of building predictive analytics from text data extracted from earnings call transcripts.

2. Background

Earnings calls are conference calls between the management of publicly trade companies, financial analysts, news media, and investors regarding a company's financial results. Earnings calls typically comprise prepared releases regarding financial data of the company, prepared statements read by company executives, and a question and answer period in which management answers questions from call participants.

Financial analysts attempt to interpret the information and management statements provided in earnings calls to gain insight into a company and predict its financial performance.

Therefore, it would be desirable to have a method and apparatus that take into account at least some of the issues discussed above, as well as other possible issues.

SUMMARY

An illustrative embodiment provides a computer-implemented method of textual data analysis. The method comprises parsing, according to natural language processing, text data extracted from a first number of transcripts related to a number of companies. A number of intermediate metrics are created comprising numerical representations of the parsed text data and derivations of the parsed text data. The intermediate metrics are then combined into a number of different combinations, wherein each combination comprises a headline analytic. A machine learning model tests each headline analytic for standalone predictive efficacy based on historical data. Headline analytics with standalone predictive efficacies above a first threshold are selected. The machine learning model then tests each selected headline analytic for additive predictive efficacy to determine if the selected headline analytic incrementally increases the predictive efficacy of a preexisting economic analytic above a second threshold based on historical data. Selected headline analytics with an additive predictive efficacy above the second threshold are applied to a second number of transcripts in combination with the preexisting economic analytic to predict financial performance of companies that are the subjects of the second number of transcripts.

Another illustrative embodiment provides system for textual data analysis. The system comprises a storage device configured to store program instructions and one or more processors operably connected to the storage device and configured to execute the program instructions to cause the system to: parsing, according to natural language processing, text data extracted from a first number of transcripts related to a number of companies; create a number of intermediate metrics comprising numerical representations of the parsed text data and derivations of the parsed text data; combine the intermediate metrics into a number of different combinations, wherein each combination comprises a headline analytic; test, according to a machine learning model, each headline analytic for standalone predictive efficacy based on historical data; select headline analytics with standalone predictive efficacies above a first threshold; test, according to the machine learning model, each selected headline analytic for additive predictive efficacy to determine if the selected headline analytic incrementally increases the predictive efficacy of a preexisting economic analytic above a second threshold based on historical data; and apply, to a second number of transcripts, the selected headline analytics with an additive predictive efficacy above the second threshold, in combination with the preexisting economic analytic, to predict financial performance of companies that are the subjects of the second number of transcripts.

Another illustrative embodiment provides a computer program product for textual data analysis. The computer program product comprises a computer-readable storage medium having program instructions embodied thereon to perform the steps of: parsing, according to natural language processing, text data extracted from a first number of transcripts related to a number of companies; creating a number of intermediate metrics comprising numerical representations of the parsed text data and derivations of the parsed text data; combining the intermediate metrics into a number of different combinations, wherein each combination comprises a headline analytic; testing, according to a machine learning model, each headline analytic for standalone predictive efficacy based on historical data; selecting headline analytics with standalone predictive efficacies above a first threshold; testing, according to the machine learning model, each selected headline analytic for additive predictive efficacy to determine if the selected headline analytic incrementally increases the predictive efficacy of a preexisting economic analytic above a second threshold based on historical data; and applying, to a second number of transcripts, the selected headline analytics with an additive predictive efficacy above the second threshold, in combination with the preexisting economic analytic, to predict financial performance of companies that are the subjects of the second number of transcripts.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that the amount of unstructured data in the world is increasing at an exponential rate and cannot be feasibly processed manually. The illustrative embodiments recognize and take into account that unstructured data are largely underexplored in equity investing due to their higher costs.

The illustrative embodiments also recognize and take into account that earnings call transcripts of companies are important sources of potentially valuable forecasting insight regarding future financial performance of firms. However, the illustrative embodiments also recognize and take into account that much of the potentially valuable information in earnings call transcripts comprises unstructured data.

The illustrative embodiments provide a method for extracting predictive and descriptive analytics from earnings call transcripts with natural language processing (NLP). The analytics are tested for both standalone predictive efficacy as well as additive predictive efficacy in combination with preestablished market analytics.

Figure 1:
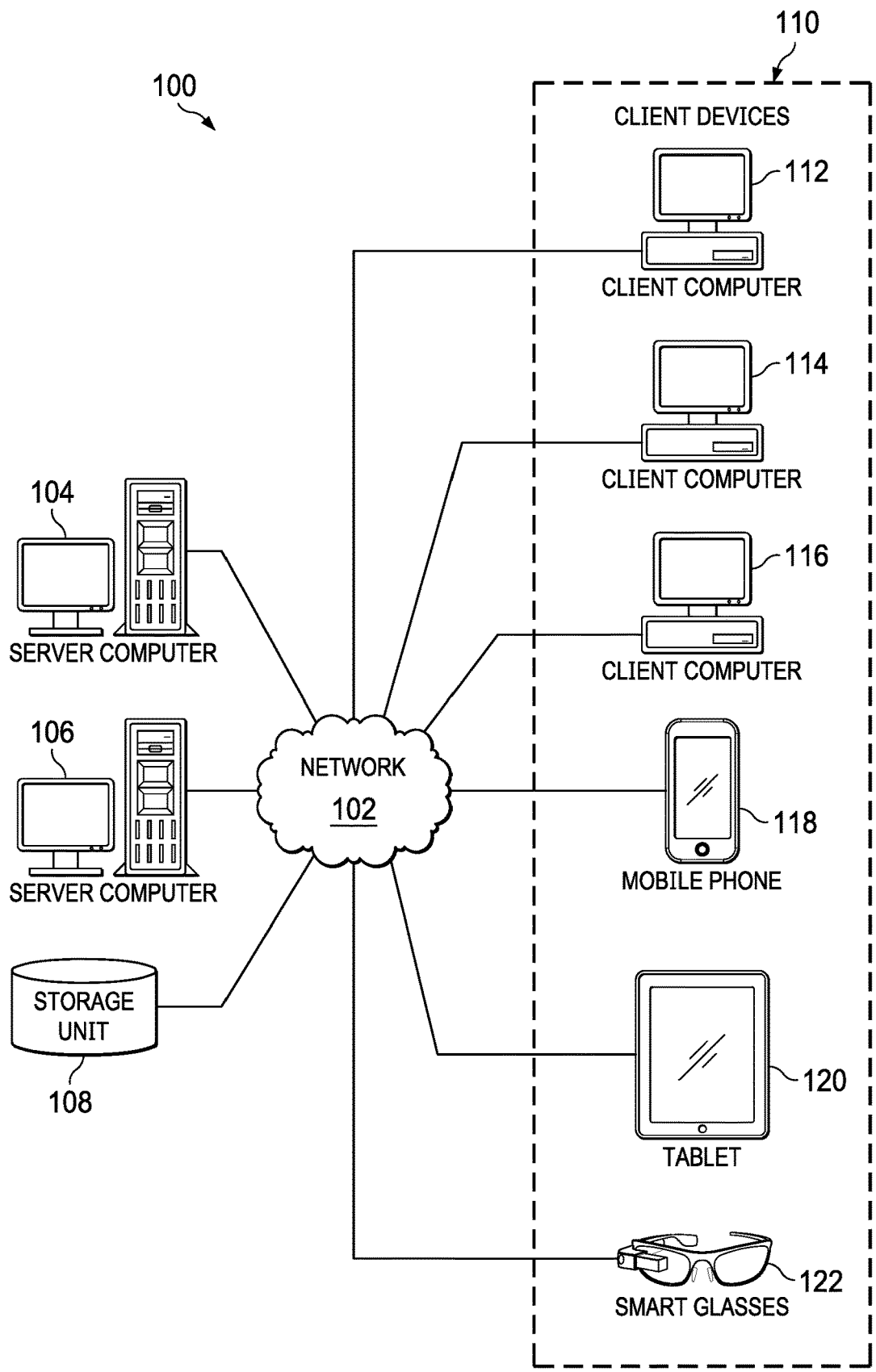
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
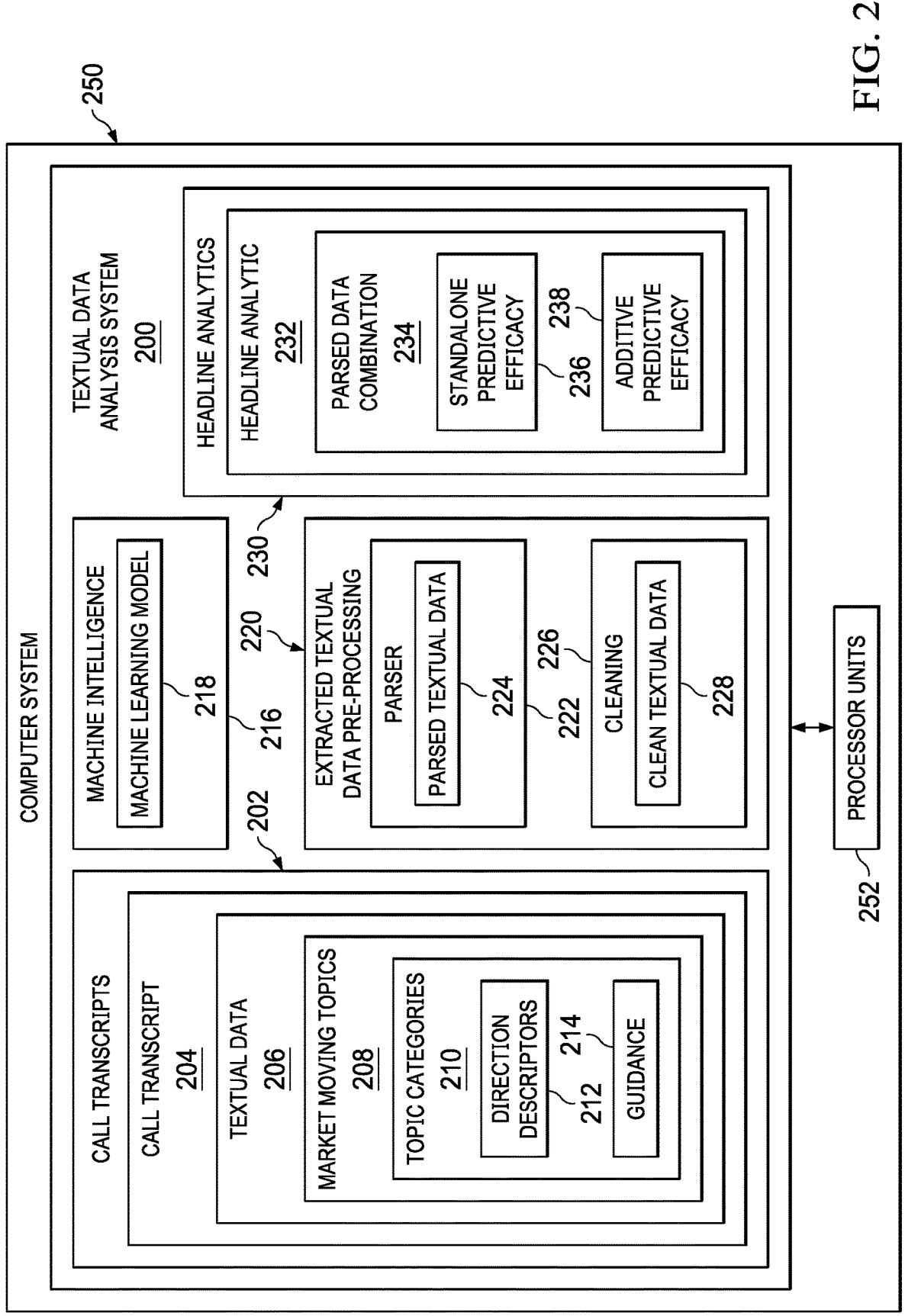
FIG. 2 is a block diagram of a textual data analysis system depicted in accordance with an illustrative embodiment.

FIG. 2 is a block diagram of a textual data analysis system depicted in accordance with an illustrative embodiment. Textual data analysis system 200 might be implemented in network data processing system 100 in FIG. 1.

Textual data analysis system 200 uses textual data extracted from earnings call transcripts 202. U.S. earnings calls have call operators, C-level executives, Wall Street analysts commonly participate on the calls. The texts with the richest and market moving content are those spoken by executives and Wall Street analysts. Therefore, texts from those two groups of speakers may be specifically extracted for analysis. Unique labeling may be applied that associates specific persons participating in a call with transcribed speech.

Each call transcript 204 comprises textual data 206 that may include keys words and phrases that fall within several broad categories used to evaluate the substantive information conveyed in the transcript 204.

Table 1 contains example phrases that may be used to identify market moving topics 208. One natural place to find market moving topics is executives' discussions regarding the financials of a company, which is the main purpose of an earnings call.

Since many of the topics are comprised of two or more contiguous words (e.g., earnings per share), each transcript may be parsed into sets of n-grams ranging from 1-gram (i.e., unigram) to 8-gram after stripping out the stop words. Empirically, trigrams seem to be the best n-gram to capture the desired market moving topics. as shown below.

TABLE 1

| ('Trigram', Frequency Count) | |
| --- | --- |
| ('earnings per share', 7572) | ('quarter full year', 1753) |
| ('forward looking statements', 5609) | ('versus last year', 1744) |
| ('free cash flow', 4824) | ('second half year', 1655) |
| ('good morning everyone', 3524) | ('operating cash flow', 1646) |
| ('quarter last year', 2990) | ('versus prior year', 1579) |
| ('thank good morning', 2250) | ('chief executive officer', 1399) |
| ('double digit growth', 2178) | ('cause actual results', 1373) |
| ('chief financial officer', 2088) | ('thanks good morning', 1373) |
| ('effective tax rate', 2009) | ('actual results differ', 1368) |
| ('constant currency basis', 1800) | ('mid single digit', 1231) |

After manually examining the most frequently appearing trigrams, related tags are grouped into topic categories 210 as shown below in Table 2. In the example in Table 2, topics include revenue, earnings, and profitability. Other example categories may include cash flow, operating income, and shareholder return. Each category may include a number of topic tags. For example, earnings may be denoted by tags such as EPS, earning per share, bottom line, etc.

TABLE 2

| Topic Category | Topic Tags |
| --- | --- |
| Revenue | {"sales", "revenue", 'top line', 'top bottom line', 'net revenue', 'organic revenue growth', 'organic sales growth', 'operational sales'} |
| Earnings | {"eps", "earnings", "earnings per share", "net income", "bottom line", "top bottom line"} |
| Profitability | {"margin", "gross margin", "operating margin", "return invested capital", "return capital"} |

Within the topic categories 210, neighboring descriptor tags may include direction descriptors 212 and guidance 214.

Table 3 below illustrates directional categories and associated descriptor tags. For simplicity sake, there are only two sets of directional tags for this publication: directionally positive or negative. Many flagged topics have neighboring directional descriptors (e.g., increased, decreased). For example, an earnings call transcript might include a sentence stating, "Our cloud business had another quarter of robust revenue growth." In this example, "revenue" is a tag in the revenue topic category, and "growth" is a neighboring descriptor tag denoting positive direction.

TABLE 3

| Directional Category | Directional Descriptor Tags |
| --- | --- |
| Positive Direction | {"increase", "increased", "increases", "increasing", "increasingly", "expand", "expanded", "expanding", "expands", "expansion", "expansions", "grow", "grows", "grew", "growth", "growths", "improve", "improved", "improves", "improvement", "improvements", "strong", "stronger", "strongest", "strongly"} |
| Negative Direction | {"decline", "declined", "declines", "declining", "deteriorate", "deteriorates", "deteriorated", "deteriorating", "compress", "compressed", "compresses", "compressing", "compressible", "compression", "reduce", "reduces", "reduced", "reducing", "reduction", "reductions", "weak", "weaker", "weakest", "weaken", "weakens", "weakened", "weakening", "weakness", "weaknesses"} |

Table 4 comprises example neighboring tags related to the broad category of guidance 214. Guidance tags generally comprise terms regarding future orientation.

TABLE 4

| Guidance Category | Guidance Tags |
| --- | --- |
| Guidance | {"full year outlook", "full year expect", "guidance", "outlook", "forecast", "expect", "expects", "expected", "expecting", "expectation", "expectations"} |

Textual data analysis system comprises extracted textual data pre-processing 220. Parser 222 parses call transcripts 202 to produce parsed textual data 224. Parser 222 parses relevant texts into sentences, which serve as the base unit. The sequential order of the parsed sentences may be preserved for each call transcript.

Cleaning 226 applies several methods to parsed textual data to produce clean textual data 228. Cleaning 226 may comprise performing at least one of expanding contractions, removing punctuations, removing stop words, filtering on a master word list, making all letters lower case, or tokenizing sentences.

Cleaning 226 may also comprise removing data biases from the extracted text data. Such biases might include look-ahead bias and survivorship bias. Look-ahead bias may be resolved by including a time component, an indelible timestamp for every data point such as an earnings call. For example, firm X has a call on Monday of a week, yet the transcript is not transcribed until Wednesday. To be conservative, the new information in the call will only be used starting on Thursday of that week at the earliest by the algorithm. Survivorship bias may be resolved by keeping track of constituents in an investable universe such as, e.g., the S&P 500 index, on every trading day. The content of a company's call transcript will only be used if the company is a part of the index's constituency on that particular date by the algorithm.

The cleaned parsed textual data 228 can be used to build various headline analytics 230. Each headline analytic 232 comprises a different combination 234 of parsed data inputs. Headline analytics 230 may comprise market moving topics and neighboring descriptors, weighted average sentiment scores, and gauging call level transparency via executives' behaviors and decisions. Market moving topics and neighboring descriptors distill earnings call transcripts down to a set of key financials-related topics (e.g., earnings) and neighboring descriptors to extract insights on the financial state and the trajectory of the firms. Firms whose executives reference the most instances of a financials related topic (e.g., earnings) in a directionally positive light should outperform. Directional tags around a topic may be a good proxy to gauge whether a firm is growing, stagnating or declining. The frequency of the mentions may be a good proxy to measure the magnitude of that growth and the confidence around it.

Weighted average sentiment scores may employ different weighting schemes. One weighting scheme uses a concept from information retrieval called term frequency-inverse document frequency (TF-IDF). The weights (i.e., IDF) are determined by how commonly a word reference appears in a corpus, which in the present context may be a rolling window of a company's five most recent earnings calls. A sentiment word that appears scarcely (or abundantly) in such a corpus receives a bigger (or smaller) weight.

Another weighting scheme examines the language similarity (i.e., usage) of a firm's call relative to its historical ones. The similarity scores are the weights that are used to amplify or deflate changes in sentiment scores (e.g., year-over-year sentiment change). A low call similarity score (i.e., dissimilarity) may be viewed as a flagged instance of oddity or discontinuity.

Gauging call level transparency via executives' behaviors and decisions during earnings calls attempts to quantify the level of transparency that firms provide during earnings calls. A call with a higher level of transparency is deemed of a higher quality and is viewed favorably in our narrative. Measures for gauging transparency may include: i) the number of references to guidance, ii) language similarity between calls, iii) the decision of timing via how early do firms introduce numbers, and iv) self-attribution bias via the blame game.

Machine intelligence 216 may employ a machine learning model 218 to test both the standalone predictive efficacy 236 and additive predictive efficacy 238 of each headline analytic 232. Standalone predictive efficacy 236 determines whether a headline analytic has demonstrated forecasting power historically. Additive predictive efficacy 238 determines whether a headline analytic has predictive efficacy above and beyond the set of signals that is commonly used by practitioners who have been distilling and perfecting analytics for years and decades. The baseline signals historically use numerical data points that are sourced from firms' financials (e.g., net income), firms' market information (e.g., daily price), and firms' analyst coverage information (e.g., numerical representation of stock recommendations such as 'buy', 'neutral' or 'sell'). The additive efficacy 238 in the present context means that the predictive power of the analytics that are constructed from the textual portion of the calls is complementary to the predictive power of the baseline analytics.

There are three main categories of machine learning: supervised, unsupervised, and reinforced learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

The illustrative embodiments may use supervised machine learning methods such as, e.g., regression, correlations, and clustering. Examples of frameworks for machine learning in the illustrative embodiments include feature engineering and information retrieval.

Textual data analysis system 200 can be implemented in software, hardware, firmware, or a combination thereof. When software is used, the operations performed by textual data analysis system 200 can be implemented in program code configured to run on hardware, such as a processor unit. When firmware is used, the operations performed by textual data analysis system 200 can be implemented in program code and data and stored in persistent memory to run on a processor unit. When hardware is employed, the hardware may include circuits that operate to perform the operations in textual data analysis system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for textual data analysis system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, textual data analysis system 200 can run on one or more processors 252 in computer system 250. As used herein a processor unit is a hardware device and is comprised of hardware circuits such as those on an integrated circuit that respond and process instructions and program code that operate a computer. When one or more processors 252 execute instructions for a process, one or more processors 252 that can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a digital signal processor (DSP), or some other type of processor.

Figure 3:
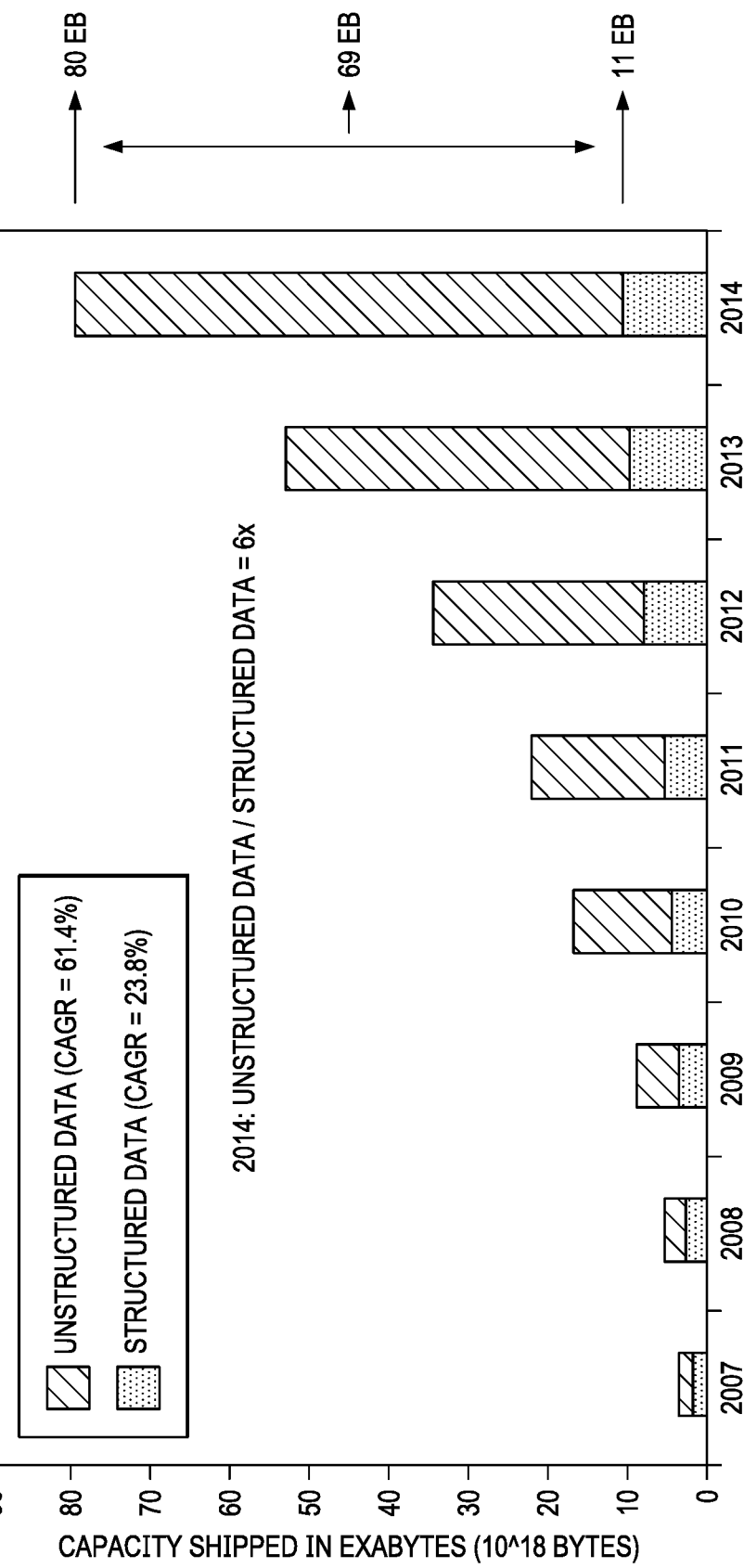
FIG. 3 depicts a graph illustrating the growth in structured and unstructured market in recent years.

FIG. 3 depicts a graph illustrating the growth in structured and unstructured market in recent years. In recent years approximately two and a half exabytes ($10^{18}$) of unstructured data have been created daily on the internet and continues to grow. To put things into perspective, the amount of unstructured data now created in two days is equivalent to the same amount of data that was created from the beginning of humankind through the end of 2003. According to International Data Corporation (IDC), eighty percent of all available data over the internet are unstructured, and the growth rate gap between unstructured and structured data is only widening, as shown in FIG. 3. Humans have two ways to process, understand, and harness the information content of these vast, relatively untapped content sets: manual processing, which is infeasible given both the amount and speed of growth and change of the data, or automatic processing, which may employ natural language process (NLP).

Figure 4:
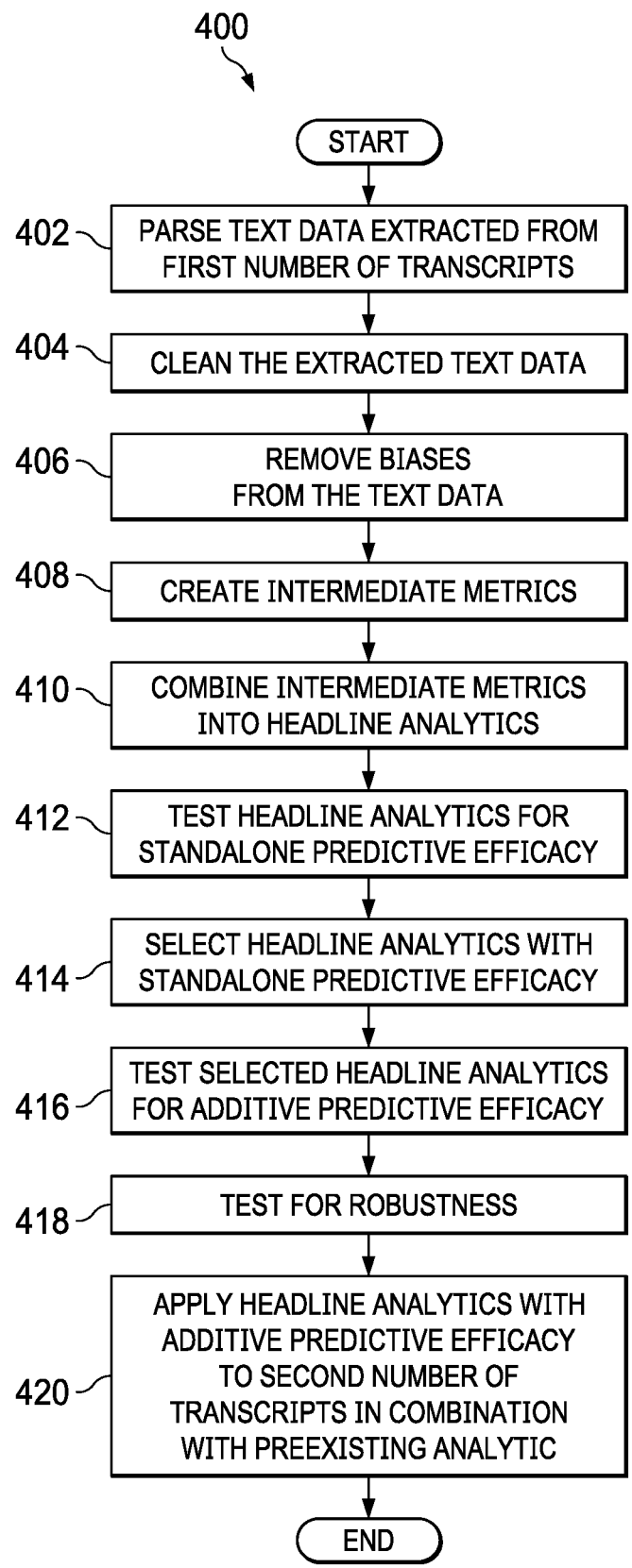
FIG. 4 depicts a flowchart illustrating a process for analyzing textual data in accordance with an illustrative embodiment.

FIG. 4 depicts a flowchart illustrating a process for analyzing textual data in accordance with an illustrative embodiment. Process 400 can be implemented in hardware, software, or both. When implemented in software, the process can take the form of program code that is run by one of more processor units located in one or more hardware devices in one or more computer systems. Process 400 might be implemented in textual data analysis system 200 in FIG. 2 and system 500 in FIG. 5.

Process 400 begins parsing, according to natural language processing, text data extracted from a first number of transcripts related to a number of companies (step 402). The extracted text data may comprise transcriptions of speech spoken by company executives and financial analysts. Parsing the extracted text data may comprise parsing the text into sentences that serve as base units of analysis, wherein the sequential order of sentences is preserved from the transcripts.

Process 400 then cleans the extracted text data (step 404). Cleaning the extracted text data may comprise expanding contractions. In an embodiment, over 100 known contractions may be expanded. Cleaning may also comprise making all letters lower case and removing punctuations.

Cleaning the extracted text may comprise filtering on a master word list. In an embodiment, the master word list is a list of 85,000+ words including every inflection of a word. The master word list may also be non-transitory comprising no abbreviations, acronyms, or tradenames.

Cleaning the extracted text may also comprise tokenizing each sentence into tokens of words, abbreviations, acronyms, proper nouns, special terms, symbols, numbers, and punctuations, while preserving the sequential order of the tokens for each sentence.

For certain analytics, stop words (e.g., definite and indefinite articles, prepositions, etc.) are removed.

Process 400 also removes data biases from the extracted text data before combining the text data (step 406). The data biases might comprise look-ahead bias and/or survivorship bias.

Process 400 then creates a number of intermediate metrics (i.e., inputs) comprising numerical representations of the parsed text data and derivations of the parsed text data (step 408).

Process 400 then combines the intermediate metrics into a number of different combinations (step 410). Each combination comprises a headline analytic. Headline analytics may fall within three broad groups comprising market moving topics and neighboring descriptors, weighted average sentiment scores, and gauging call level transparency via executives' behaviors and decisions.

Each headline analytic is tested according to a machine learning model for standalone predictive efficacy based on historical data (step 412). Process 400 selects headline analytics with standalone predictive efficacies above a first threshold (step 414).

Each selected headline analytic is tested according to the machine learning model for additive predictive efficacy to determine if the selected headline analytic incrementally increases the predictive efficacy of a preexisting economic analytic above a second threshold based on historical data (step 416).

Testing the selected headline analytics for additive predictive efficacy may further comprise checking the additive predictive efficacy of each selected headline analytic for robustness (step 418). Checking for robustness may comprise determining if the additive predictive efficacy is limited to a specific industry sector, limited to a particular calendar year or quarter, or limited to a specific construction wherein the predictive efficacy disappears with one or more modifications to the construction.

The selected headline analytics with an additive predictive efficacy above the second threshold are applied, in combination with the preexisting economic analytic, to a second number of transcripts to predict financial performance of companies that are the subjects of the second number of transcripts (step 420). Process 400 then ends.

Figure 5:
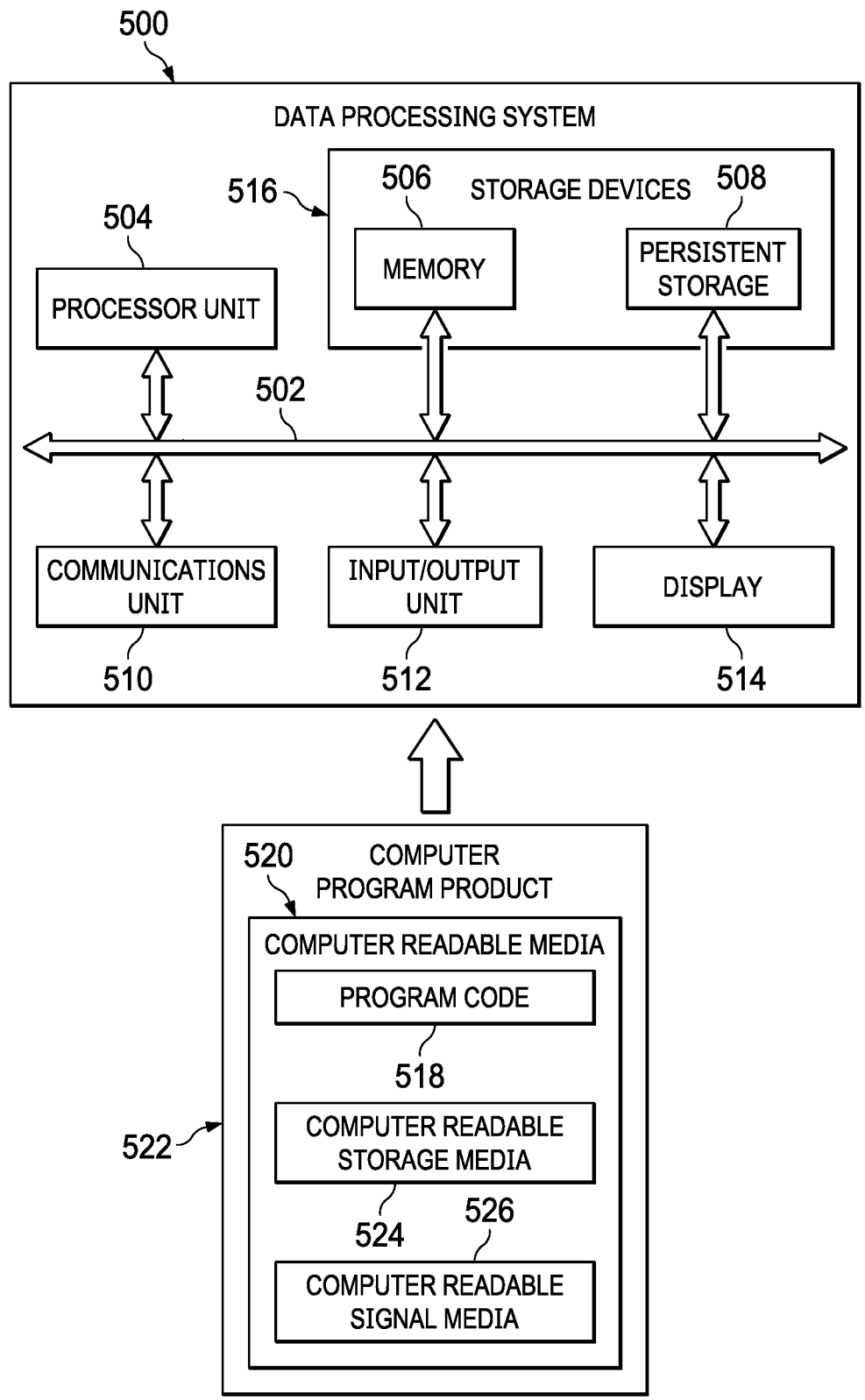
FIG. 5 is a block diagram of a data processing system in accordance with an illustrative embodiment.

Turning now to FIG. 5, an illustration of a block diagram of a data processing system is depicted in accordance with an illustrative embodiment. Data processing system 500 may be used to implement server computers 104 and 106 and client devices 110 in FIG. 1, as well as computer system 250 in FIG. 2. In this illustrative example, data processing system 500 includes communications framework 502, which provides communications between processor unit 504, memory 506, persistent storage 508, communications unit 510, input/output unit 512, and display 514. In this example, communications framework 502 may take the form of a bus system.

Processor unit 504 serves to execute instructions for software that may be loaded into memory 506. Processor unit 504 may be a number of processors, a multi-processor core, or some other type of processor, depending on the particular implementation. In an embodiment, processor unit 504 comprises one or more conventional general-purpose central processing units (CPUs). In an alternate embodiment, processor unit 504 comprises one or more graphical processing units (CPUs).

Memory 506 and persistent storage 508 are examples of storage devices 516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 516 may also be referred to as computer-readable storage devices in these illustrative examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508. Communications unit 510, in these illustrative examples, provides for communications with other data processing systems or devices. In these illustrative examples, communications unit 510 is a network interface card.

Input/output unit 512 allows for input and output of data with other devices that may be connected to data processing system 500. For example, input/output unit 512 may provide a connection for user input through at least one of a keyboard, a mouse, or some other suitable input device. Further, input/output unit 512 may send output to a printer. Display 514 provides a mechanism to display information to a user.

Instructions for at least one of the operating system, applications, or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer-usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these illustrative examples. In one example, computer-readable media 520 may be computer-readable storage media 524 or computer-readable signal media 526.

In these illustrative examples, computer-readable storage media 524 is a physical or tangible storage device used to store program code 518 rather than a medium that propagates or transmits program code 518. Computer readable storage media 524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 518 may be transferred to data processing system 500 using computer-readable signal media 526. Computer-readable signal media 526 may be, for example, a propagated data signal containing program code 518. For example, computer-readable signal media 526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code 518.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of textual data analysis, the method comprising:
using a number of processors to perform the steps of:
parsing, according to natural language processing, text data extracted from a first number of transcripts related to a number of companies;
creating a number of intermediate metrics comprising numerical representations of the parsed text data and derivations of the parsed text data;
combining the intermediate metrics into a number of different combinations, wherein each combination comprises a headline analytic;
testing, according to a machine learning model, each headline analytic for standalone predictive efficacy based on historical data;
selecting headline analytics with standalone predictive efficacies above a first threshold;
testing, according to the machine learning model, each selected headline analytic for additive predictive efficacy to determine if the selected headline analytic incrementally increases the predictive efficacy of a preexisting economic analytic above a second threshold based on historical data; and
applying, to a second number of transcripts, the selected headline analytics with an additive predictive efficacy above the second threshold, in combination with the preexisting economic analytic, to predict financial performance of companies that are the subjects of the second number of transcripts.

2. The method of claim 1, wherein testing the selected headline analytics for additive predictive efficacy further comprises checking the additive predictive efficacy of each selected headline analytic for robustness.

3. The method of claim 2, wherein checking the additive predictive efficacy of each selected headline analytic for robustness comprises determining if the additive predictive efficacy is limited to a specific industry sector.

4. The method of claim 2, wherein checking the additive predictive efficacy of each selected headline analytic for robustness comprises determining if the additive predictive efficacy is limited to a particular calendar year or quarter.

5. The method of claim 2, wherein checking the additive predictive efficacy of each selected headline analytic for robustness comprises determining if the additive predictive efficacy is limited to a specific construction wherein the predictive efficacy disappears with one or more modifications to the construction.

6. The method of claim 1, wherein the extracted text data comprise transcriptions of speech spoken by company executives and financial analysts.

7. The method of claim 1, wherein parsing the extracted text data comprises parsing the text into sentences that serve as base units of analysis, wherein the sequential order of sentences is preserved from the transcripts.

8. The method of claim 1, further comprising cleaning the extracted text data by performing at least one of:
   expanding contractions;
   removing punctuations;
   removing stop words;
   filtering on a master word list;
   making all letters lower case; or
   tokenizing sentences.

9. The method of claim 1, wherein the transcripts comprise earnings call transcripts.

10. The method of claim 1, further comprising removing data biases from the extracted text data before creating the intermediate metrics and headline analytics.

11. The method of claim 10, wherein data biases might comprise at least one of:
   look-ahead bias; or
   survivorship bias.

12. The method of claim 1, wherein each headline analytic might comprise one of:
   market moving topics and neighboring descriptors;
   weighted average sentiment score; or
   gauging call level transparency.

13. A system for textual data analysis, the system comprising:
   a storage device configured to store program instructions; and
   one or more processors operably connected to the storage device and configured to execute the program instructions to cause the system to:
      parsing, according to natural language processing, text data extracted from a first number of transcripts related to a number of companies;
      create a number of intermediate metrics comprising numerical representations of the parsed text data and derivations of the parsed text data;
      combine the intermediate metrics into a number of different combinations, wherein each combination comprises a headline analytic;
      test, according to a machine learning model, each headline analytic for standalone predictive efficacy based on historical data;
      select headline analytics with standalone predictive efficacies above a first threshold;
      test, according to the machine learning model, each selected headline analytic for additive predictive efficacy to determine if the selected headline analytic incrementally increases the predictive efficacy of a preexisting economic analytic above a second threshold based on historical data; and
      apply, to a second number of transcripts, the selected headline analytics with an additive predictive efficacy above the second threshold, in combination with the preexisting economic analytic, to predict financial performance of companies that are the subjects of the second number of transcripts.

14. The system of claim 13, wherein testing the selected headline analytics for additive predictive efficacy further comprises checking the additive predictive efficacy of each selected headline analytic for robustness.

15. The system of claim 14, wherein checking the additive predictive efficacy of each selected headline analytic for robustness comprises determining if the additive predictive efficacy is limited to a specific industry sector.

16. The system of claim 14, wherein checking the additive predictive efficacy of each selected headline analytic for robustness comprises determining if the additive predictive efficacy is limited to a particular calendar year or quarter.

17. The system of claim 14, wherein checking the additive predictive efficacy of each selected headline analytic for robustness comprises determining if the additive predictive efficacy is limited to a specific construction wherein the predictive efficacy disappears with one or more modifications to the construction.

18. The system of claim 13, wherein the extracted text data comprise transcriptions of speech spoken by company executives and financial analysts.

19. The system of claim 13, wherein parsing the extracted text data comprises parsing the text into sentences that serve as base units of analysis, wherein the sequential order of sentences is preserved from the transcripts.

20. The system of claim 13, wherein the processors further execute instructions for cleaning the extracted text data by performing at least one of:
   expanding contractions;
   removing punctuations;
   removing stop words;
   filtering on a master word list;
   making all letters lower case; or
   tokenizing sentences.

21. The system of claim 13, wherein the transcripts comprise earnings call transcripts.

22. The system of claim 13, wherein the processors further execute instructions for removing data biases from the extracted text data before creating the intermediate metrics and headline analytics.

23. The system of claim 13, wherein data biases might comprise at least one of:
   look-ahead bias; or
   survivorship bias.

24. The system of claim 13, wherein each headline analytic might comprise one of:
   market moving topics and neighboring descriptors;
   weighted average sentiment score; or
   gauging call level transparency.

25. A computer program product for textual data analysis, the computer program product comprising:
- a computer-readable storage medium having program instructions embodied thereon to perform the steps of:
  - parsing, according to natural language processing, text data extracted from a first number of transcripts related to a number of companies;
  - creating a number of intermediate metrics comprising numerical representations of the parsed text data and derivations of the parsed text data;
  - combining the intermediate metrics into a number of different combinations, wherein each combination comprises a headline analytic;
  - testing, according to a machine learning model, each headline analytic for standalone predictive efficacy based on historical data;
  - selecting headline analytics with standalone predictive efficacies above a first threshold;
  - testing, according to the machine learning model, each selected headline analytic for additive predictive efficacy to determine if the selected headline analytic incrementally increases the predictive efficacy of a preexisting economic analytic above a second threshold based on historical data; and
  - applying, to a second number of transcripts, the selected headline analytics with an additive predictive efficacy above the second threshold, in combination with the preexisting economic analytic, to predict financial performance of companies that are the subjects of the second number of transcripts.

26. The computer program product of claim 25, wherein testing the selected headline analytics for additive predictive efficacy further comprises checking the additive predictive efficacy of each selected headline analytic for robustness.

27. The computer program product of claim 26, wherein checking the additive predictive efficacy of each selected headline analytic for robustness comprises determining if the additive predictive efficacy is limited to a specific industry sector.

28. The computer program product of claim 26, wherein checking the additive predictive efficacy of each selected headline analytic for robustness comprises determining if the additive predictive efficacy is limited to a particular calendar year or quarter.

29. The computer program product of claim 26, wherein checking the additive predictive efficacy of each selected headline analytic for robustness comprises determining if the additive predictive efficacy is limited to a specific construction wherein the predictive efficacy disappears with one or more modifications to the construction.

30. The computer program product of claim 25, wherein the extracted text data comprise transcriptions of speech spoken by company executives and financial analysts.

31. The computer program product of claim 25, wherein parsing the extracted text data comprises parsing the text into sentences that serve as base units of analysis, wherein the sequential order of sentences is preserved from the transcripts.

32. The computer program product of claim 25, further comprising instructions for cleaning the extracted text data by performing at least one of:
- expanding contractions;
- removing punctuations;
- removing stop words;
- filtering on a master word list;
- making all letters lower case; or
- tokenizing sentences.

33. The computer program product of claim 25, wherein the transcripts comprise earnings call transcripts.

34. The computer program product of claim 25, further comprising instructions for removing data biases from the extracted text data before creating the intermediate metrics and headline analytics.

35. The computer program product of claim 25, wherein data biases might comprise at least one of:
- look-ahead bias; or
- survivorship bias.

36. The computer program product of claim 25, wherein each headline analytic might comprise one of:
- market moving topics and neighboring descriptors;
- weighted average sentiment score; or
- gauging call level transparency.

* * * * *